United States Patent
Takahashi

(10) Patent No.: US 9,544,475 B2
(45) Date of Patent: Jan. 10, 2017

(54) DATA TRANSFER APPARATUS AND DATA TRANSFER METHOD

(71) Applicant: MegaChips Corporation, Osaka-shi (JP)

(72) Inventor: Kazuma Takahashi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 461 days.

(21) Appl. No.: 13/785,234

(22) Filed: Mar. 5, 2013

(65) Prior Publication Data

US 2013/0235235 A1    Sep. 12, 2013

(30) Foreign Application Priority Data

Mar. 8, 2012   (JP) ................. 2012-051425

(51) Int. Cl.
*H04N 5/217*   (2011.01)
*H04N 5/357*   (2011.01)

(52) U.S. Cl.
CPC .......... *H04N 5/2173* (2013.01); *H04N 5/3572* (2013.01)

(58) Field of Classification Search
None
See application file for complete search history.

(56) References Cited

U.S. PATENT DOCUMENTS

| | | | | |
|---|---|---|---|---|
| 8,447,134 B1* | 5/2013 | Reader et al. | ........... | 382/275 |
| 2005/0073525 A1* | 4/2005 | Chao et al. | ........... | 345/531 |
| 2007/0279426 A1* | 12/2007 | Tanaka et al. | ........... | 345/544 |
| 2011/0122298 A1 | 5/2011 | Takahashi et al. | | |

FOREIGN PATENT DOCUMENTS

| | | |
|---|---|---|
| JP | 2009-164674 | 7/2009 |
| JP | 2011-113234 | 6/2011 |

OTHER PUBLICATIONS

Office Action issued on Nov. 17, 2015 in Japanese Patent Application No. 2012-051425, along with its English translation.
Office Action issued on May 17, 2016 in Japanese Patent Application No. 2012-051425, along with its English translation.

* cited by examiner

*Primary Examiner* — Barry Drennan
*Assistant Examiner* — Diana Hickey
(74) *Attorney, Agent, or Firm* — Oblon, McClelland, Maier & Neustadt, L.L.P.

(57) ABSTRACT

A data transfer apparatus includes a cache memory having a storing portion for writing and reading data at a higher speed than an image data storing portion which stores image data GD of an input image, and data transfer request means for outputting, to the cache memory, a transfer request for image data in a certain region of the input image. The cache memory reads unstored image data from the image data storing portion beyond a reading region corresponding to a transfer request every pixel row if image data in a pixel row included in the reading region is not stored in the storing portion of the cache memory. Moreover, the data transfer request means sequentially gives, in arrangement order in a horizontal direction of an input image, a transfer request for image data in each of reading regions arranged in the horizontal direction.

9 Claims, 14 Drawing Sheets

FIG. 2
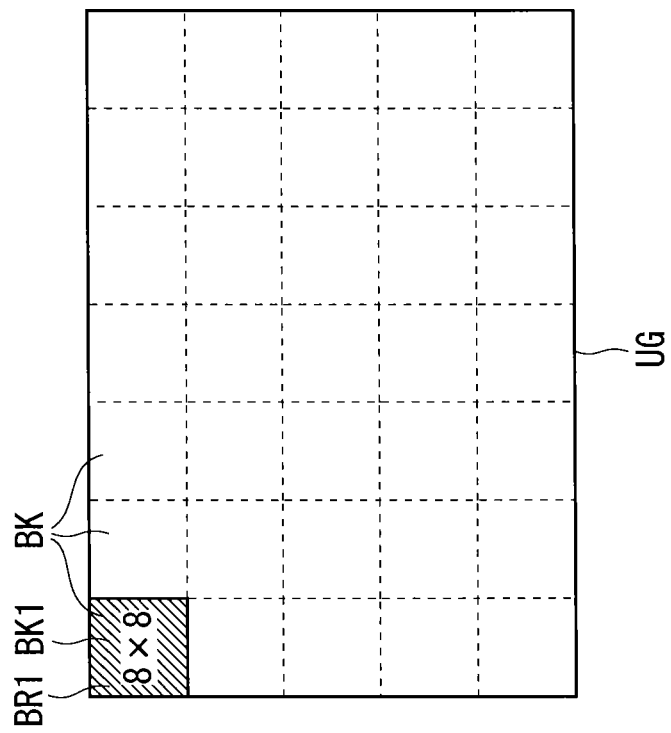
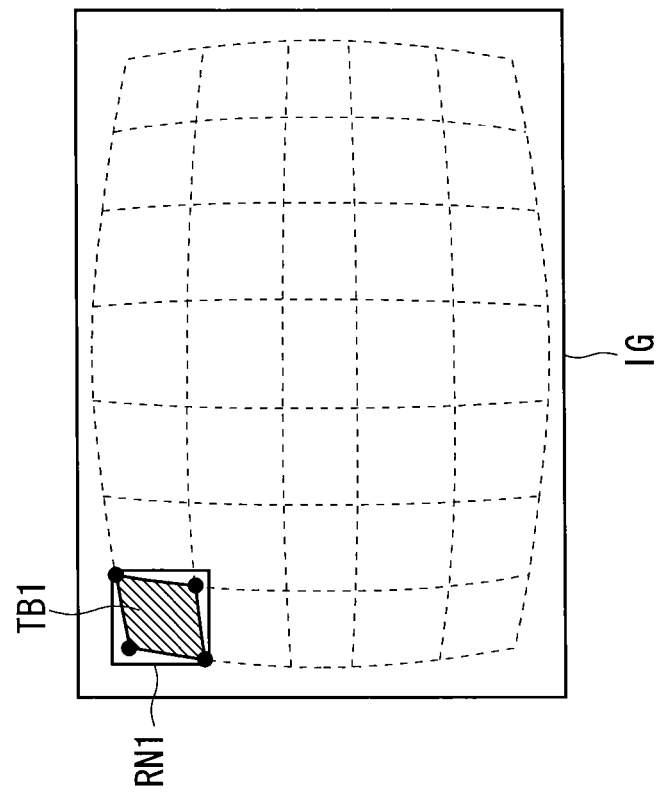

F I G. 5

| CLASSIFICATION OF STORAGE REGION | ROW NUMBER OF IMAGE DATA TO BE STORED |
|---|---|
| 0 | 0TH ROW, 16TH ROW, ⋯ |
| 1 | 1TH ROW, 17TH ROW, ⋯ |
| 2 | 2TH ROW, 18TH ROW, ⋯ |
| 3 | 3TH ROW, 19TH ROW, ⋯ |
| ⋮ | ⋮ |
| 13 | 13TH ROW, 29TH ROW, ⋯ |
| 14 | 14TH ROW, 30TH ROW, ⋯ |
| 15 | 15TH ROW, 31TH ROW, ⋯ |

FIG. 6

| ADDRESS | INFORMATION TO BE STORED IN MANAGING MEMORY |
|---|---|
| 0 | CONTENT STORED IN CLASSIFIED STORAGE REGION OF "0" |
| 1 | CONTENT STORED IN CLASSIFIED STORAGE REGION OF "1" |
| 2 | CONTENT STORED IN CLASSIFIED STORAGE REGION OF "2" |
| 3 | CONTENT STORED IN CLASSIFIED STORAGE REGION OF "3" |
| ⋮ | ⋮ |
| 14 | CONTENT STORED IN CLASSIFIED STORAGE REGION OF "14" |
| 15 | CONTENT STORED IN CLASSIFIED STORAGE REGION OF "15" |

F I G . 1 2

| CLASSIFICATION OF STORAGE REGION | ROW NUMBER OF STORED IMAGE DATA |
|---|---|
| | FIRST READING PROCESSING |
| 0 | 16 |
| 1 | 17 |
| 2 | 18 |
| 3 | 19 |
| 4 | 20 |
| 5 | 21 |
| 6 | — |
| 7 | — |
| 8 | — |
| 9 | — |
| 10 | 10 |
| 11 | 11 |
| 12 | 12 |
| 13 | 13 |
| 14 | 14 |
| 15 | 15 |

FIG. 13

| CLASSIFICATION OF STORAGE REGION | ROW NUMBER OF STORED IMAGE DATA | |
|---|---|---|
| | FIRST READING PROCESSING | SECOND READING PROCESSING |
| 0 | 16 | |
| 1 | 17 | |
| 2 | 18 | |
| 3 | 19 | |
| 4 | ~~20~~ | 4 |
| 5 | ~~21~~ | 5 |
| 6 | — | 6 |
| 7 | — | 7 |
| 8 | — | 8 |
| 9 | — | 9 |
| 10 | 10 | |
| 11 | 11 | |
| 12 | 12 | |
| 13 | 13 | |
| 14 | 14 | |
| 15 | 15 | |

F I G . 1 4
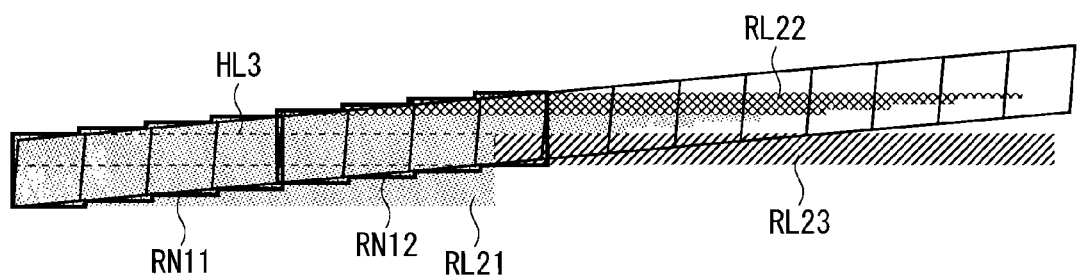

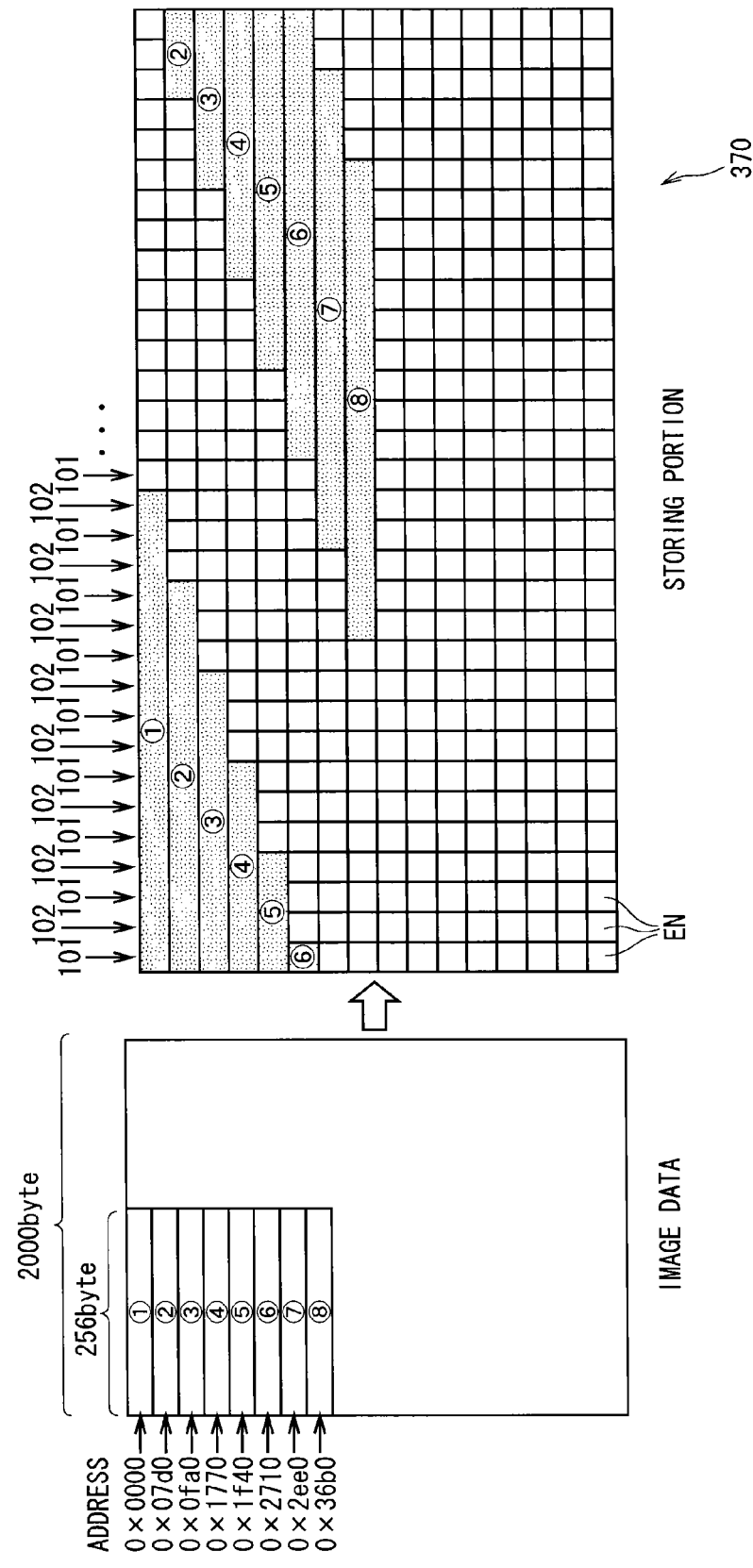

DATA TRANSFER APPARATUS AND DATA TRANSFER METHOD

BACKGROUND OF THE INVENTION

Field of the Invention

The present invention relates to a technique for transferring data.

Description of the Background Art

In an image processing apparatus such as an image pickup apparatus, generally, image data acquired by an image pickup device such as a CCD is once stored in a storing portion (for example, a DRAM or the like) in the image pickup apparatus. Then, the image data is read from the storing portion and are subjected to various image processings.

For example, Japanese Patent Application Laid-Open No. 2011-113234 describes an image processing apparatus for reading image data from an image data storing portion storing the image data and correcting a distortion of an image in a distortion correcting portion.

Referring to the image processing apparatus described in the Japanese Patent Application Laid-Open No. 2011-113234, image data is read by using a DMAC (Direct Memory Access Controller) in response to a transfer request for image data from a distortion correcting portion. In this case, a processing speed of a distortion correction is influenced by a reading speed of an image data storing portion. In other words, a transfer speed of image data from the image data storing portion to the distortion correcting portion is low. For this reason, the processing speed of the distortion correction is reduced.

The reduction in the processing speed might be caused also in a transfer of image data in response to a transfer request given from a processing portion for performing another image processing.

SUMMARY OF THE INVENTION

It is an object to provide a technique capable of increasing a transfer speed of image data which meets a transfer request of the image data.

A first aspect of a data transfer apparatus according to the present invention includes a cache memory having a storing portion for writing and reading data at a higher speed than storing means which stores image data on a predetermined image, and transfer request means for outputting, to the cache memory, a transfer request for image data in a certain region in the predetermined image, the cache memory includes reading control means for deciding, every pixel row, whether image data in the pixel row included in the certain region corresponding to the transfer request is stored in the storing portion of the cache memory or not and reading unstored image data which is not stored in the storing portion from the storing means beyond the certain region every pixel row, storing control means for storing, in the storing portion, unstored image data for the pixel row read by the reading control means with a storage destination changed every pixel row, and output control means for reading image data in a certain region corresponding to the transfer request from the storing portion and outputting the image data to the transfer request means, and the transfer request means sequentially gives a transfer request for image data in each of the plurality of certain regions arranged in a horizontal direction of the predetermined image in arrangement order in the horizontal direction.

Moreover, a second aspect of the present invention is directed to the data transfer apparatus according to the first aspect, wherein the storing portion has a plurality of classified storage regions for dividing and storing, every pixel row, image data for each of the pixel rows, the plurality of classified storage regions are numbered in order from zero, respectively, and the storing control means stores unstored image data for each of the pixel rows read by the reading control means in a classified storage region indicated by a remainder obtained by dividing a row number of the pixel row in the predetermined image by a total number of the classified storage regions.

Furthermore, a third aspect of the present invention is directed to the data transfer apparatus according to the first aspect, wherein the reading control means sequentially reads the unstored image data up to a position exceeding the certain region in a certain row direction every pixel row.

In addition, a fourth aspect of the present invention is directed to the data transfer apparatus according to the second or third aspect, wherein the storing portion has classified storage regions in a number to be a power of two.

Moreover, a fifth aspect of the present invention is directed to the data transfer apparatus according to the first aspect, wherein the transfer request means has a distortion correcting function for performing distortion correction processing which corrects a distortion of the predetermined image, and the transfer request means sets the plurality of certain regions arranged in a horizontal direction of the predetermined image with a gradual shift in a perpendicular direction to the horizontal direction in response to a distortion of the predetermined image.

Furthermore, a sixth aspect of the present invention is directed to the data transfer apparatus according to the second aspect, wherein the storing portion is constituted by using a first storing portion and a second storing portion which are physically different from each other, the plurality of classified storage regions are alternately set every number of the classified storage regions in either of the first storing portion and the second storing portion, and the storing control means alternately stores, every pixel row, unstored image data for each of the pixel rows read by the reading control means in either of the first storing portion and the second storing portion.

In addition, a seventh aspect of the present invention is directed to the data transfer apparatus according to the second aspect, wherein the storing portion is constituted by using a first storing portion and a second storing portion which are physically different from each other, each of the classified storage regions is set across the first storing portion and the second storing portion, and the storing control means alternately stores, every predetermined data volume, unstored image data for each of the pixel rows read by the reading control means in either of the first storing portion and the second storing portion.

Moreover, a data transfer method according to the present invention uses a cache memory having a storing portion for writing and reading data at a higher speed than storing means which stores image data on a predetermined image, and includes the steps of a) sequentially acquiring a transfer request for image data in each of certain regions arranged in a horizontal direction of the predetermined image in arrangement order in the horizontal direction, b) deciding, every pixel row, whether image data in the pixel row included in the certain region corresponding to the transfer request is stored in the storing portion of the cache memory or not and reading unstored image data which is not stored in the storing portion from the storing means beyond the certain region every pixel row, c) storing, in the storing portion, unstored image data for the pixel row read by the reading control means with a storage destination changed every pixel row, and d) reading image data in a certain region corresponding to the transfer request from the storing portion and outputting the image data to the transfer request means.

According to the present invention, it is possible to increase a transfer speed of image data which meets a transfer request for the image data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing a state of distortion correction processing;

FIG. 5 is a table showing a storage mode for image data in a storing portion;

FIG. 6 is a table showing a management mode for stored contents in a managing memory;

FIG. 12 is a table showing a storage mode for image data in the storing portion;

FIG. 13 is a table showing a storage mode for image data in the storing portion;

FIG. 14 is a diagram showing another mode for a reading range to be read by reading processing;

FIG. 16 is a diagram showing another storage mode for image data in the case in which the storing portion is constituted by using the two SRAMs.

DESCRIPTION OF THE PREFERRED EMBODIMENTS

A preferred embodiment will be described below with reference to the drawings.

<1. Preferred Embodiment>
[1-1. Summary of Structure]

Figure 1:
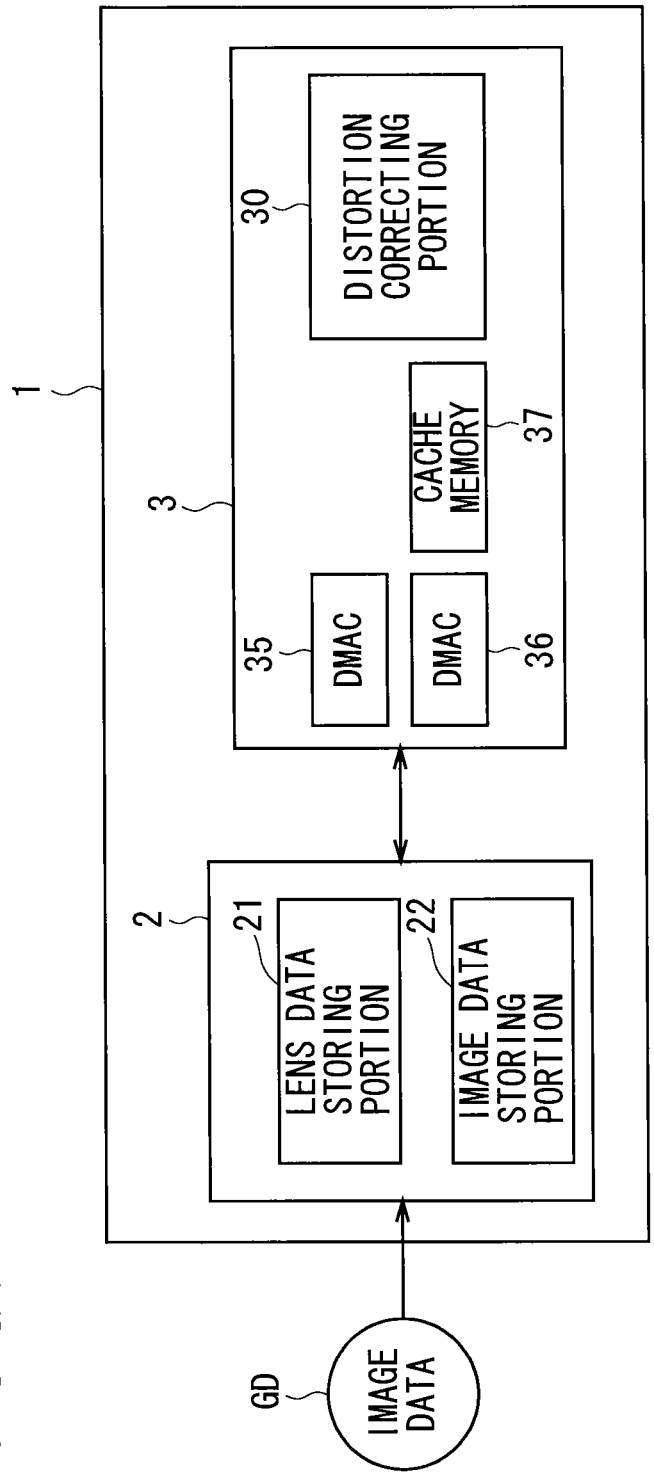
FIG. 1 is a schematic diagram showing a structure of an image processing apparatus according to a preferred embodiment of the present invention.

FIG. 1 is a schematic diagram showing a structure of an image processing apparatus 1 according to a preferred embodiment of the present invention. The image processing apparatus 1 includes an image pickup apparatus having an image pickup device and a portable telephone, a personal computer (PC), a portable information terminal unit and the like, for example.

As shown in FIG. 1, the image processing apparatus 1 includes a first processing circuit 2 and a second processing circuit 3, both of which are constituted as integrated circuits on substrates.

The first processing circuit 2 has a lens data storing portion 21 and an image data storing portion 22. The image data storing portion 22 is storing means such as a DRAM having a capacity capable of storing a plurality of pieces of image data and serves to store image data GD of an image (an input image) which is input to the image processing apparatus 1 or is picked up by the image pickup device in the image processing apparatus 1. The lens data storing portion 21 stores lens data on a lens of an image pickup apparatus picking up the input image data GD. For example, information about a distortion of an image caused by an aberration of a lens (which is also referred to as "distortion information") is stored as the lens data.

The second processing circuit 3 is constituted as an image processing circuit and performs various pieces of image processing on the image data GD saved in the image data storing portion 22. In particular, the second processing circuit 3 according to the present preferred embodiment has a distortion correcting portion 30 for performing processing for correcting a distortion of an image (which is also referred to as "distortion correction processing") on the input image data GD.

Figure 3:
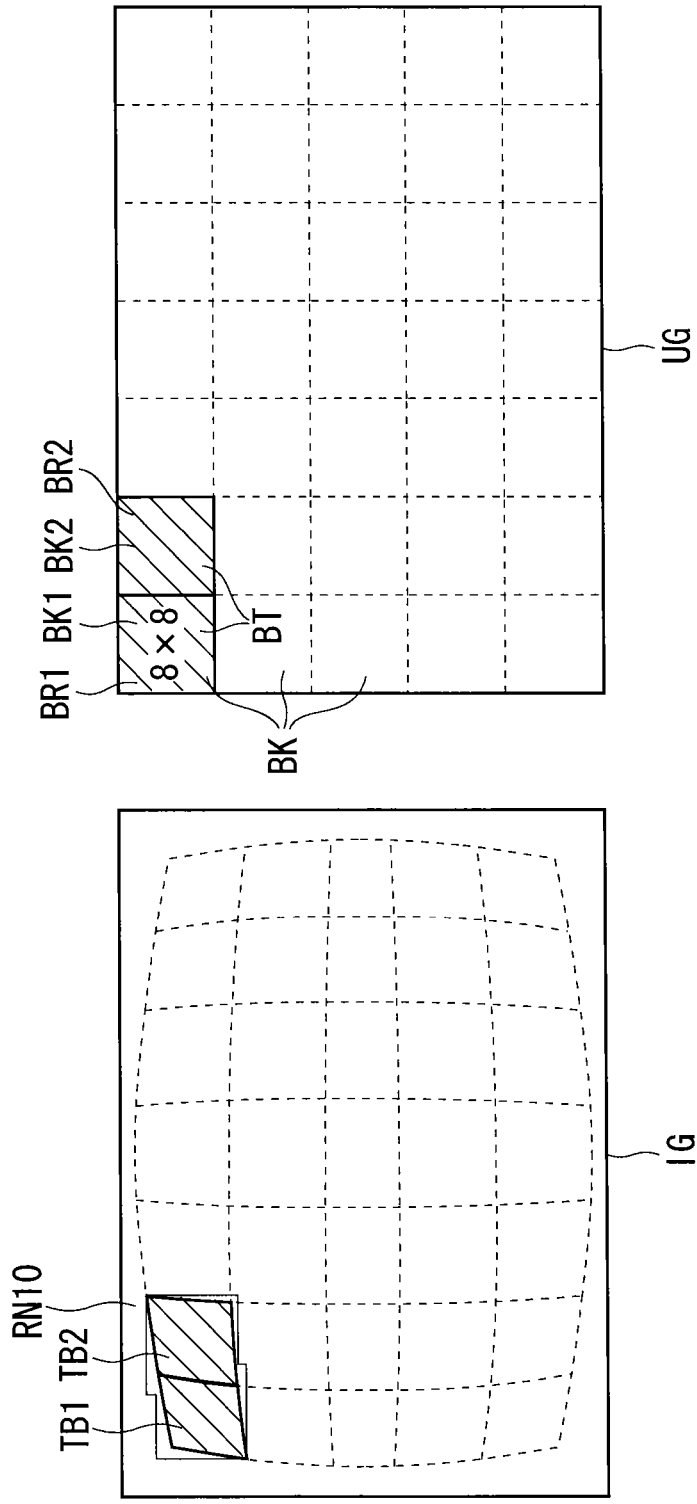
FIG. 3 is a diagram showing another state of the distortion correction processing.

The distortion correction processing will be schematically described. FIGS. 2 and 3 are diagrams showing a state of the distortion correction processing, and FIG. 2 illustrates an input image IG having a barrel type distortion aberration and an output image UG subjected to the distortion correction processing. In the input image IG, a distortion of a subject which is caused by a distortion aberration is shown in a broken line.

As shown in FIG. 2, the distortion correction processing is executed by the image processing apparatus 1 every rectangular region BK (which is also referred to as a "pixel block" or a "block") obtained by dividing the output image UG into a plurality of regions. For example, when a block BK1 is a block BR to be an executing target for the distortion correction processing (which is also referred to as an "executing target block") (a hatching region in FIG. 2), a pixel value of each pixel in the block BK1 is calculated by using a pixel value (which is also referred to as "pixel data") of a pixel in the vicinity of a corresponding block TB1 corresponding to the block BK1 in the input image IG.

In more detail, in the case in which the distortion correction processing is performed on the block BK1, the distortion correcting portion 30 outputs a transfer request for acquiring a pixel value of each pixel included in a region (a reading region) RN1 surrounding the corresponding block TB1. Then, the distortion correcting portion 30 performs an interpolation operation using the pixel value of the pixel in the region RN1 which is acquired in response to the transfer request, thereby calculating the pixel value of the pixel in the block BK1 (the executing target block BR). The pixel value of the pixel in the block BK1 which is thus calculated is a pixel value of each pixel subjected to the distortion correction.

In the distortion correction processing, the distortion correction on a unit of the block BK is sequentially executed in a horizontal direction by setting a left and upper block as a starting block for the respective blocks BK constituting the output image UG. In other words, the distortion correcting portion 30 sequentially sets, in the horizontal direction, respective reading regions surrounding respective corresponding blocks of the blocks BK and sequentially outputs transfer requests for image data included in the reading regions arranged and set in the horizontal direction respectively in arrangement order in the horizontal direction in response to the execution of the distortion correction processing. By using the image data in the reading region which are acquired in response to the transfer request, then, the distortion correcting portion 30 calculates a pixel value of each pixel in the block every block BK and generates the output image UG in which a subject distortion is finally corrected.

In order to execute the distortion correction, moreover, the distortion correcting portion 30 may simultaneously acquire pixel values of respective pixels included in a region (a reading region) RN10 surrounding a plurality of blocks arranged continuously. For example, as shown in FIG. 3, the distortion correcting portion 30 may simultaneously acquire pixel values of respective pixels included in the region RN10 containing corresponding blocks TB1 and TB2 corresponding to two blocks BK1 and BK2 arranged continuously, thereby calculating pixel values of respective pixels in the blocks BK1 and BK2 (executing target blocks BR1 and BR2). In this case, a transfer request for acquiring the pixel values of the pixels included in the region RN10 is output from the distortion correcting portion 30.

Then, the distortion correcting portion 30 executes the distortion correction processing every executing target block while sequentially acquiring the pixel values of the respective pixels in the reading region every reading region.

Thus, the distortion correcting portion 30 functions as data transfer request means for outputting a transfer request for reading image data included in a predetermined region of the input image IG in order to execute the distortion correction processing as image processing.

It is also possible to employ a mode for automatically setting a size of the block BK by the image processing apparatus 1 or a mode capable of designating the size by a user. In the present preferred embodiment, description will be given by taking, as an example, the case in which the block BK has eight longitudinal pixels and eight horizontal pixels, that is, 8, by 8, pixels.

Returning to the description of FIG. 1, the second processing circuit 3 further has DMACs (direct memory access controllers) 35 and 36 for controlling a data transfer between the first processing circuit 2 and the second processing circuit 3, and a cache memory 37. In the image processing apparatus 1, a data transfer through a bus between the first processing circuit 2 and the second processing circuit 3 is performed based on control signals sent from the DMACs 35 and 36 in place of a CPU.

More specifically, a request for reading lens data output from the distortion correcting portion 30 is input to the DMAC 35. The DMAC 35 reads the lens data from the lens data storing portion 21 through a bus in response to the reading request. The lens data thus read is utilized for the distortion correction processing in the distortion correcting portion 30.

Moreover, the request for transferring the image data output from the distortion correcting portion 30 is input to the cache memory 37. In the case in which the image data corresponding to the transfer request is stored in a storing portion of the cache memory 37, the cache memory 37 outputs the data stored in the storing portion to the distortion correcting portion 30.

On the other hand, in the case in which the image data corresponding to the transfer request is not stored in the storing portion of the cache memory 37, the cache memory 37 outputs, to the DMAC 36, a reading request for reading unstored data which is not stored in the storing portion. The DMAC 36 reads image data from the image data storing portion 22 through a bus in response to the reading request. The image data read from the image data storing portion 22 is input to the cache memory 37 and is stored in the storing portion in the cache memory 37. Then, the cache memory 37 outputs, to the distortion correcting portion 30, the image data corresponding to the transfer request given from the distortion correcting portion 30.

As described above, the cache memory 37 reads insufficient image data from the image data storing portion 22 in response to the request for transferring the image data output from the distortion correcting portion 30 serving as the data transfer request means, and transfers image data to be a transfer request target to the distortion correcting portion 30. The image processing apparatus 1 having the cache memory 37 is also referred to as a "data transfer apparatus".

[1-2. Detailed Structure of Cache Memory]

Figure 4:
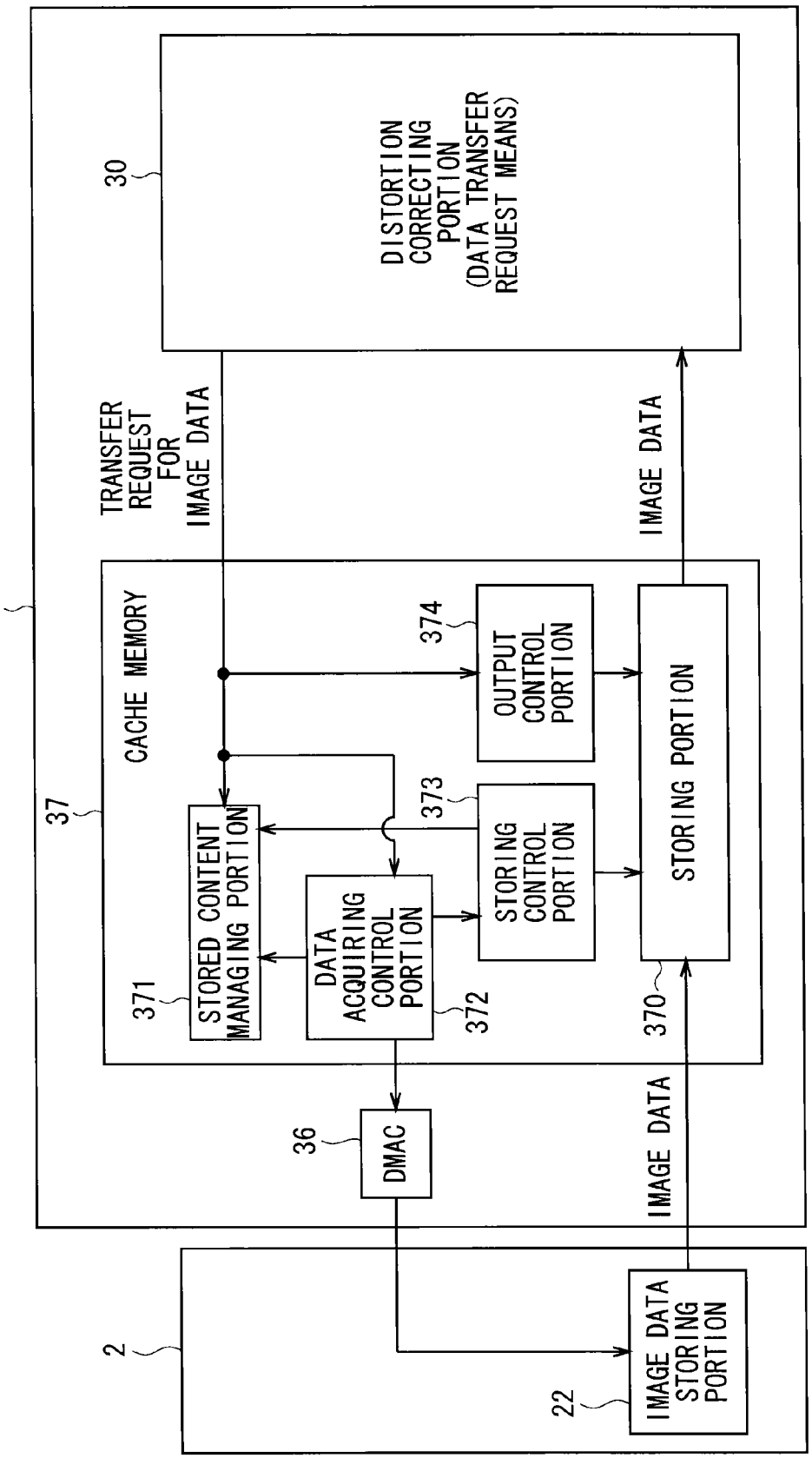
FIG. 4 is a diagram showing a detailed structure of a cache memory in the image processing apparatus.

Next, a detailed structure of the cache memory 37 will be described. FIG. 4 is a diagram showing the detailed structure of the cache memory 37 in the image processing apparatus 1. FIG. 5 is a table showing a storage mode for image data in a storing portion 370. FIG. 6 is a table showing a management mode for stored contents in a managing memory.

As shown in FIG. 4, the cache memory 37 has the storing portion 370, a stored content managing portion 371, a data acquiring control portion (reading control means) 372, a storing control portion 373 and an output control portion 374.

The storing portion 370 can write and read data at a higher speed than the image data storing portion 22. An SRAM or the like is employed for the storing portion 370, for example, and the storing portion 370 stores image data read from the image data storing portion 22.

Description will be given to a mode for storing image data in the storing portion 370.

In the storing portion 370, image data in a row of a pixel in a horizontal direction in the input image IG (which is also referred to as a "pixel row") is stored in a classification into different storage regions every pixel row. The storage region classified every pixel row is also referred to as a "classified storage region" and is numbered sequentially from zero. Each of the classified storage regions stores image data in a specific pixel row determined based on a row number (a line number) in accordance with a predetermined rule.

For example, there is assumed the case in which the storing portion 370 has 16 classified storage regions of "0" to "15" as shown in FIG. 5. In each pixel row in the input image IG, it is assumed that a row in an uppermost part is set to have a row number of "0" and each pixel row is numbered by a method of increasing the row number by one in a downward direction from the row in the uppermost part. In this case, in the storing portion 370, the image data in a certain pixel row is stored in a classified storage region indicated by a remainder obtained by dividing the row number of the pixel row by the number of the classified storage regions of "16".

In more detail, a classified storage region of "0" stores image data in a pixel row having a row number in which a remainder obtained by dividing the row number by the number of the classified storage regions, that is, "16" is "0" (for example, image data in a 0th row, image data in a 16th row or the like). Moreover, a classified storage region of "1" stores image data in a pixel row having a row number in which a remainder obtained by dividing the row number by the number of the classified storage regions, that is, "16" is "1" (for example, image data in a first row, image data in a 17th row or the like). Furthermore, a classified storage region of "15" stores image data in a pixel row having a row number in which a remainder obtained by dividing the row number by the number of the classified storage regions, that is, "16" is "15" (for example, image data in a 15th row, image data in a 31st row or the like).

In the storing portion 370, thus, a save destination for image data in each pixel row included in the input image IG is determined based on the pixel row.

Returning to the explanation of the structure of the cache memory 37 (see FIG. 4), the stored content managing portion 371 has a function for managing the stored contents of image data which is stored in the storing portion 370. More specifically, the stored content managing portion 371 has a managing memory such as an SRAM. The managing memory holds information indicative of a position in the input image IG where image data stored currently in each classified storage region of the storing portion 370 are present (which is also referred to as "stored content information" or "stored contents").

As a mode for managing the stored contents in the managing memory, for example, a mode in FIG. 6 can be illustrated.

More specifically, storage regions in addresses of "0" to "15" are reserved in the managing memory shown in FIG. 6. A line number of image data stored in the respective classified storage regions of "0" to "15" in the storing portion 370, a starting address and a burst length (in detail, the number of operations for continuously transferring, from the starting address, data in a predetermined quantity of a bit length transferred consecutively) is stored as the stored contents in the storage regions having the addresses of "0" to "15", respectively.

For example, contents stored in the classified storage region of "0" in the storing portion 370 are stored in the storage region having the address of "0" in the managing memory. Moreover, contents stored in the classified storage region of "1" in the storing portion 370 are stored in the storage region having the address of "1" in the managing memory. Furthermore, contents stored in the classified storage region of "15" in the storing portion 370 are stored in the storage region having the address of "15" in the managing memory.

In the managing memory of the stored content managing portion 371, thus, the contents stored in the respective classified storage regions of the storing portion 370 are separately managed every classified storage region.

Returning to the explanation of the structure of the cache memory 37 (see FIG. 4), when inputting a request for transferring image data from the distortion correcting portion 30, the data acquiring control portion 372 refers to storage information held by the SRAM in the stored content managing portion 371, thereby deciding whether image data corresponding to the transfer request is stored in the storing portion 370 or not. Thus, the data acquiring control portion 372 functions as deciding means for deciding whether the image data corresponding to the transfer request is stored in the storing portion 370 or not.

If the image data corresponding to the transfer request given from the distortion correcting portion 30 is not stored in the storing portion 370, the data acquiring control portion 372 outputs, to the DMAC 36, a reading request for reading unstored data. Thus, the data acquiring control portion 372 also functions as reading control means for controlling to read the unstored data.

The reading request is obtained by extending the transfer request for reading image data included in the reading region. According to the reading request, the image data is read beyond the reading region. The details will be described below.

On the other hand, if the image data corresponding to the transfer request given from the distortion correcting portion 30 is stored in the storing portion 370, the data acquiring control portion 372 does not output the reading request to the DMAC 36.

The storing control portion 373 determines, for each pixel row, an address of a storage destination (which is also referred to as a "cache address") in the storage of the image data read from the image data storing portion 22 in the storing portion 370, and outputs the cache address to the storing portion 370. The storing portion 370 stores, for each pixel row, the image data read from the image data storing portion 22 in each classified storage region in the storing portion 370 which is specified by the cache address.

The output control portion 374 performs an output control for outputting, from the storing portion 370, image data corresponding to a request for transferring image data.

[1-3. Operation of Cache Memory]

Figure 7:
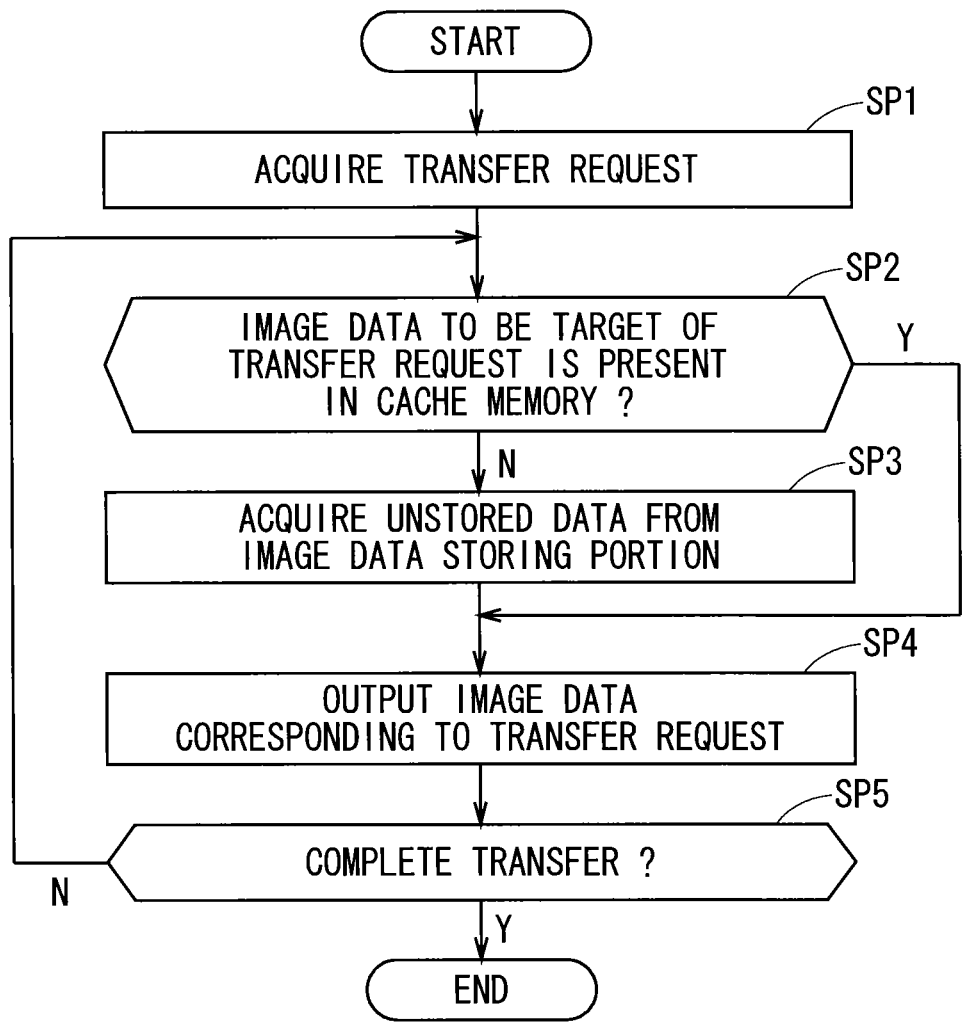
FIG. 7 is a flow chart showing an operation of the cache memory.
Figure 8:
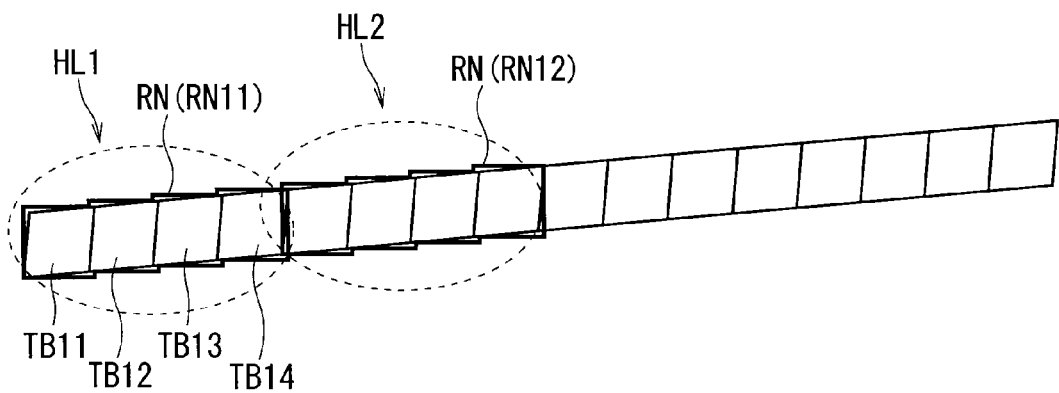
FIG. 8 is a diagram showing a state in which image data is read from a reading region in an input image in response to a transfer request given from a distortion correcting portion.

Next, an operation of the cache memory 37 will be described in detail. FIG. 7 is a flow chart showing the operation of the cache memory 37. FIG. 8 is a diagram showing a state in which image data is read from a reading region in an input image in response to a transfer request given from the distortion correcting portion 30.

As shown in FIG. 7, in Step SP1, the cache memory 37 acquires, from the distortion correcting portion 30, a transfer request for reading image data included in the reading region from the distortion correcting portion 30. The transfer request includes information about a reading start position and information about a reading end position for each row of a pixel which is contained in the reading region.

There is assumed the case in which a transfer request for setting, as a reading region, a region RN surrounding four corresponding blocks TB11 to TB14 arranged continuously is sequentially input from the distortion correcting portion 30 to the cache memory 37 in the input image IG as shown in FIG. 8. In other words, it is assumed that a transfer request related to a reading region RN11 surrounded in a broken line HL1 is input to the cache memory 37 in response to a first transfer request and a transfer request related to a reading region RN12 surrounded in a broken line HL2 is input to the cache memory 37 in response to a next transfer request.

In this case, each transfer request includes information about each pixel row in each reading region RN, and information about a reading start position and information about a reading end position for each pixel row. The information about each pixel row is a row number of a pixel row, and the information about the reading start position and the information about the reading end position indicate a reading start address and a reading end address, respectively.

In Step SP2, the data acquiring control portion 372 decides, for each pixel row included in the transfer request, whether the image data corresponding to the transfer request is present in the storing portion 370 of the cache memory 37 or not. The decision is made by comparing a row number of a pixel row included in a transfer request, a reading start address for each pixel row and a reading end address for each pixel row, and stored contents of each classified storage region which are stored in the managing memory with each other.

If it is decided that image data in a pixel row to be a target of a transfer request is present in the storing portion 370 of the cache memory 37 by the decision, an operating step skips Step SP3 and makes a transition to Step SP4.

On the other hand, if it is decided that the image data in the pixel row to be the target of the transfer request is not present in the storing portion 370 of the cache memory 37 by the decision, the operating step makes a transition to Step SP3.

In Step SP3, there is executed reading processing for acquiring, from the image data storing portion 22, unstored data in the pixel row to be the target of the transfer request based on the control of the data acquiring control portion 372.

In the reading processing, pieces of pixel data on each pixel are sequentially read in a certain row direction (a rightward direction) from any of pieces of pixel data on respective pixels constituting the unstored data which is provided on a left end.

Moreover, a data volume (a read data volume) of the image data read by single reading processing is set in such a manner that image data in a longer pixel row than a maximum width in a row direction of the reading region can be read. The read data volume depends on the number (a burst length) of operations for continuously transferring data in a predetermined volume, and a 128, bits by 16, burst lengths can be employed for a specific read data volume, for example.

By setting the read data volume of the image data read by the single reading processing as a volume in which image data in a longer pixel row than a maximum width in a row direction of the reading region can be read, thus, it is possible to read image data beyond a maximum width in the row direction of the reading region by the single reading processing.

The image data read by the reading processing is stored in the storing portion 370 of the cache memory 37.

In next Step SP4, then, image data corresponding to the transfer request is read from the storing portion 370 of the cache memory 37 by the output control portion 374 and are thus transferred to the distortion correcting portion 30.

In Step SP5, it is decided whether the transfer of image data in all the pixel rows to be the targets of the transfer request is completed or not.

If it is decided that the transfer of the image data in all the pixel rows to be the transfer targets is completed in Step SP5, the operation of the cache memory 37 corresponding to the transfer request is ended. On the other hand, if it is decided that the transfer of the image data in all the pixel rows to be the transfer targets is not completed, the operation step makes a transition to Step SP2. Subsequently, the respective steps of Step SP2 to Step SP5 are repetitively executed until the transfer of the image data for all the pixel rows to be the transfer targets is completed.

In the cache memory 37, thus, the respective steps of Step SP1 to Step SP5 are executed and data is transferred to the distortion correcting portion 30.

Figure 9:
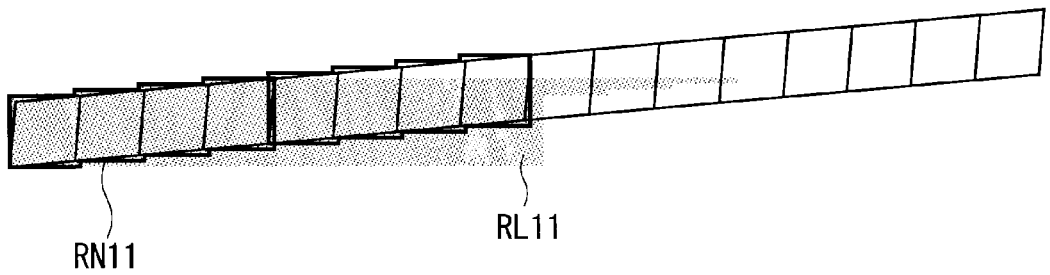
FIG. 9 is a diagram showing a state in which image data is read from a reading region in an input image in response to a transfer request given from a distortion correcting portion.
Figure 10:
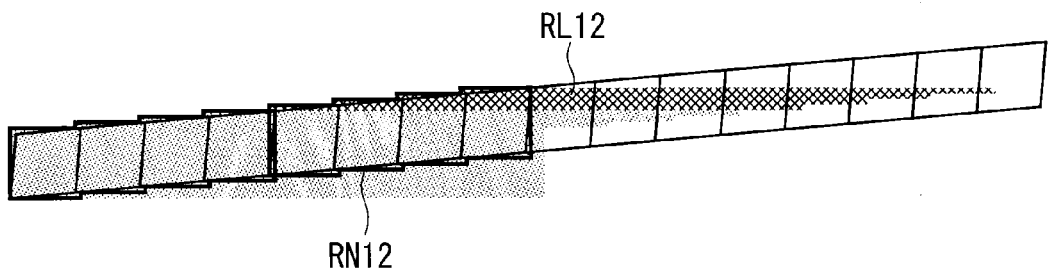
FIG. 10 is a diagram showing a state in which image data is read from a reading region in an input image in response to a transfer request given from the distortion correcting portion.
Figure 11:
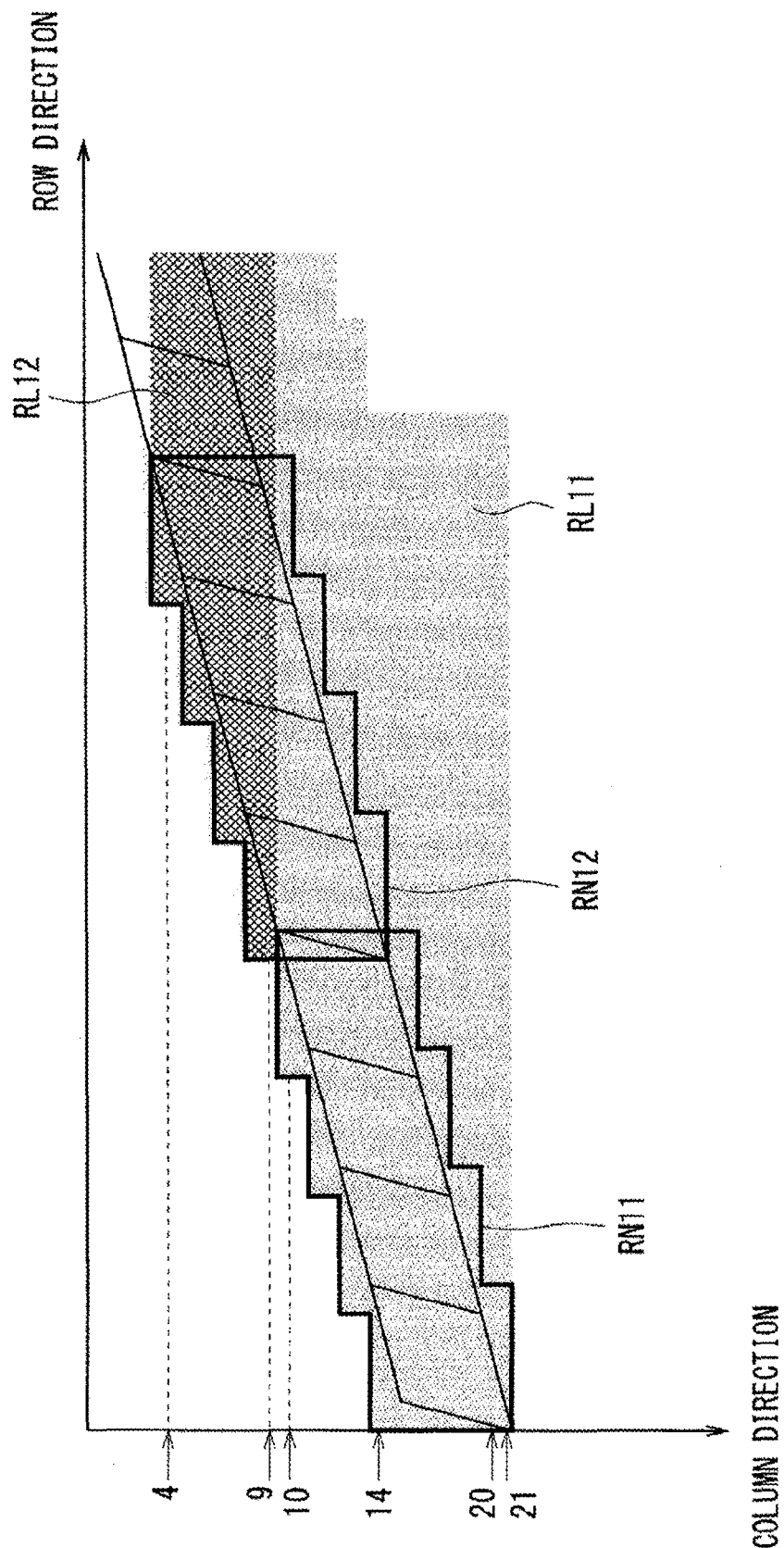
FIG. 11 is a diagram showing a state in which image data is read from a reading region in an input image in response to a transfer request given from the distortion correcting portion.

Detailed description will be given to a reading range to be read by the reading processing in Step SP3. FIG. 9 is a diagram showing a state in which image data is read from the reading region RN11 in the input image IG in response to a transfer request given from the distortion correcting portion 30. FIG. 10 is a diagram showing a state in which image data is read from the reading region RN 12 in the input image IG in response to a transfer request given from the distortion correcting portion 30. FIG. 11 is a diagram showing a state in which the image data is read from the reading regions RN11 and RN12 in the input image IG in response to the transfer request given from the distortion correcting portion 30. FIGS. 12 and 13 are tables showing a mode for storing image data in the storing portion 370.

For example, in the case in which a transfer request related to the reading region RN11 shown in FIG. 9 is input as a first transfer request after the operation of the cache memory 37 is started, the reading processing of Step SP3 is executed for all the pixel rows included in the reading region RN11 because the storing portion 370 has no image data. In the reading processing, there is read image data on each pixel included in a region RL11 (a region shown in sandy hatching) obtained by extending the reading region RN11.

In the case in which a transfer request related to the reading region RN12 shown in FIG. 10 is input as a next transfer request, furthermore, image data in any of the pixel rows which is included in the reading region RN12 and is not stored in the storing portion 370 is read in the reading processing of Step SP3. In other words, in the reading processing, pixel data on each pixel included in a region RL12 is read.

In the reading processing, thus, image data in the respective pixel rows included in the reading region is sequentially read up to a position exceeding the reading region in a certain row direction every pixel row.

Then, the image data read by the reading processing is stored in different classified storage regions in the storing portion 370 every pixel row. However, a storage destination for the image data in the storing portion 370 is determined based on a row number of each pixel row by the storing control portion 373.

More specifically, in the case in which the storing portion 370 has 16 classified storage regions from "0" to "15" as shown in FIG. 5, the storing control portion 373 determines a storage destination for image data in a certain pixel row which is read by the reading processing into a classified storage region expressed in a remainder obtained by dividing a row number of the pixel row by the number of the classified storage regions of "16".

For example, in the case in which a row number of each pixel row included in the reading region RN11 is a row number shown in FIG. 11, image data acquired by the reading processing corresponding to the first transfer request related to the reading region RN11 is stored in each classified storage region of the storing portion 370 in a mode shown in FIG. 12. In detail, the row number of each pixel row included in the reading region RN11 is "10" to "21". For this reason, image data in each pixel row having the row numbers of "10" to "21" is stored in the respective classified storage regions of "10" to "15" and "0" to "5" in the storing portion 370 respectively (see FIG. 12).

In reading processing corresponding to a next transfer request related to the reading region RN12, image data in the respective pixel rows having the row numbers of "4" to "9" included in the region RL12 is read and the image data in the pixel rows is stored in the classified storage regions of "4" to "9" in the storing portion 370 respectively (see FIG. 13).

At this time, the image data having the row number of "20" which is read by the reading processing corresponding to the first transfer request is stored in the classified storage region of "4". However, the image data is deleted and the image data having the row number of "4" is overwritten and stored. Similarly, the image data having the row number of "21" which is read by the reading processing corresponding to the first transfer request is stored in the classified storage region of "5". However, the image data is deleted and the image data having the row number of "5" is overwritten and stored.

As shown in FIG. 11, in distortion correction processing to be executed after a second transfer request, the distortion correction processing is executed by using image data included in the reading region RN12. For this reason, the image data having the row numbers of "20" and "21" which is deleted is unnecessary data which is not utilized for the distortion correction processing. Therefore, new image data having the row numbers of "4" and "5" can be overwritten and stored in the classified stored regions which store the image data having the row numbers of "20" and "21".

In the distortion correction processing, each reading region is set with a perpendicular direction to the row direction (an upward direction or a downward direction of an image) shifted gradually in response to the distortion of the input image IG. When the distortion correction processing progresses, therefore, a classified storage region for storing unnecessary image data is generated in the storing portion 370. By determining a storage destination for image data of each pixel row based on a row number, accordingly, it is possible to overwrite and store image data in a new pixel row in the classified storage region for storing the unnecessary image data. Consequently, it is possible to reduce a possibility that necessary image data for the distortion correction processing might be deleted.

On the other hand, in the case in which a cache address is determined by a direct map system for uniquely determining the cache address from a memory address and the image data in each of the pixel rows included in the reading region is thus stored in the storing portion 370, there is a possibility that storage destinations for image data included in the same reading region might overlap with each other. If the storage destinations overlap with each other, necessary image data included in the same reading region is deleted. Consequently, the necessary image data which is deleted is read again.

The determining method of setting a storage destination for image data in a certain pixel row into a classified storage region expressed in a remainder obtained by dividing a row number of the pixel row by the number of the classified storage regions of "16" can also be represented by a determining method of setting a classified storage region expressed in low order four bits of a value indicative of the row number of the certain pixel row in a binary number as a storage destination for the pixel row.

Moreover, the number of the classified storage regions to be provided in the storing portion 370 can be varied freely depending on a width in a vertical direction of the reading region, that is, the number of the pixel rows included in the reading region. In order to easily perform an operation in the determination of the storage destination for the image data, however, it is preferable that the number of the classified storage regions should be set to be a power of two.

Furthermore, detailed description will be given to another mode for a reading range to be read by the reading processing in Step SP3. FIG. 14 is a diagram showing another mode for the reading range to be read by the reading processing.

More specifically, as shown in FIG. 14, there is assumed the case in which the image data in the respective pixel rows included in a region RL21 is read by the reading processing corresponding to the first transfer request related to the reading region RN11 after the start of the operation of the cache memory 37.

In this case, in reading processing corresponding to a next transfer request related to the reading region RN12, image data in each pixel row included in a region RL23 is read in addition to the image data in each pixel row included in a region RL22.

At this time, the image data in the region RL23 is stored in each classified storage region for storing image data surrounded in a broken line HL3 which is read in the reading processing corresponding to the first transfer request. However, the classified storage region further stores the image data in the region RL23 while the image data surrounded in the broken line HL3 is also held. The reason is that the image data surrounded in the broken line HL3 is required in order to transfer the image data in the reading region RN12 to the distortion correcting portion 30.

In the case in which the image data in the same pixel row is read by the reading processing, thus, the storing control portion 373 determines a storage destination for image data read newly in order not to delete the image data which has already been stored.

When the image data read newly is to be stored, a part of the image data which has already been stored may be deleted within a range in which the image data corresponding to the transfer request given from the distortion correcting portion 30 can be transferred to the distortion correcting portion 30.

As described above, the data transfer apparatus (the image processing apparatus 1) includes the cache memory 37 for writing and reading data at a higher speed than the image data storing portion 22 (storing means) which stores the image data on the input image IG, and the data transfer request means 30 for outputting, to the cache memory 37, a transfer request for image data in a certain region of the input image IG. The cache memory 37 includes the data acquiring control portion 372 for deciding, every pixel row, whether the image data in the pixel row included in the reading region corresponding to the transfer request is stored in the storing portion of the cache memory 37 or not, and reading unstored image data which is not stored in the storing portion from the image data storing portion 22 beyond the reading region every pixel row, the storing control portion 373 for storing the unstored image data for each pixel row which are read by the data acquiring control portion 372 in the storing portion of the cache memory 37 with the storage destination changed every pixel row, and the output control portion 374 for reading the image data in the reading region corresponding to the transfer request from the storing portion in the cache memory 37 and outputting the image data to the data transfer request means 30. Moreover, the data transfer request means 30 sequentially gives, in arrangement order in a horizontal direction, the transfer request for the respective pieces of image data in the plurality of reading regions arranged in the horizontal direction of the input image IG.

In the data transfer apparatus, thus, the unstored image data is read from the image data storing portion 22 beyond the reading region every pixel row when the image data in the pixel row included in the reading region corresponding to the transfer request is not stored in the storing portion of the cache memory 37. Then, the transfer request for the image data is sequentially given in arrangement order in the horizontal direction for the respective reading regions arranged in the horizontal direction of the input image IG. Accordingly, the data transfer apparatus previously reads the image data corresponding to the transfer request and stores the same image data in the storing portion of the cache memory 37 for writing and reading data at a high speed. Therefore, it is possible to increase a transfer speed of the image data corresponding to the transfer request, and furthermore, to shorten a time required for acquiring the image data Moreover, the data acquiring control portion 372 of the data transfer apparatus sequentially reads the unstored image data up to a position exceeding the reading region in a certain row direction every pixel row when reading the unstored image data from the image data storing portion 22. Consequently, it is possible to give access in a row direction for a long period of time, thereby enhancing a transfer efficiency of a memory when reading data from the image data storing portion 22.

<2. Variant>

Although the preferred embodiment has been described above, the present invention is not restricted to the contents explained above.

Figure 15:
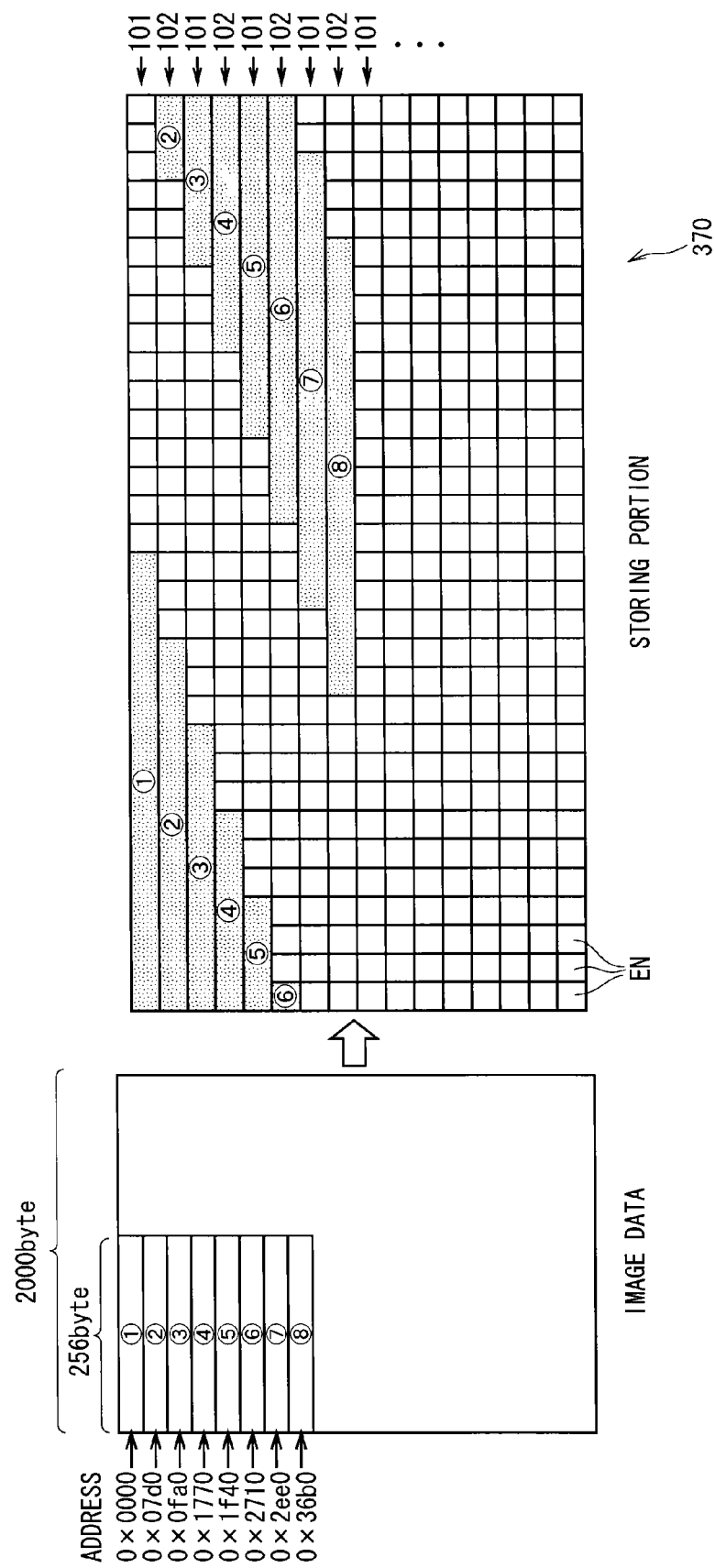
FIG. 15 is a diagram showing a storage mode for image data in the case in which the storing portion is constituted by using two SRAMs.

For example, the storing portion 370 in the cache memory 37 may be constituted by using a single SRAM or two SRAMs. FIGS. 15 and 16 are diagrams showing a mode for storing image data in the case in which the storing portion 370 is constituted by using two SRAMs 101 and 102.

In the case in which the storing portion 370 is set to have a double buffer structure by using the two SRAMs 101 and 102 as shown in FIG. 15, image data can be written to one of the two SRAMs 101 and 102, and at the same time, image data can be read from the other SRAM 101 or 102.

For example, if image data read from the image data storing portion 22 is alternately stored in the two SRAMs 101 and 102 every pixel row as shown in FIG. 15, image data can be read from one of the SRAMs 101 and 102 while the image data is written to the other SRAM 101 or 102.

The alternate storage for each pixel row is implemented by the storing control portion 373 for determining a cache address of a storage destination in the storing portion 370 for the image data which is read.

More specifically, there is assumed the case in which image data corresponding to eight rows is read every 256, bytes for each pixel row from image data having an image width of 2000, bytes in FIG. 15. Moreover, it is assumed that the image data storing portion 22 for storing image data in FIG. 15 stores image data corresponding to one byte per memory address and an entry EN of the SRAM can store data corresponding to 16 bytes for each. At this time, the storing control portion 373 uses low order four bits of a value obtained by expressing, in a binary number, a row number of a pixel row which is read as high order four bits of a cache address, and low order five bits of a value obtained by reducing low order four bits of a memory address as low order five bits of the cache address, thereby determining a cache address for storing image data in the pixel row.

In the case in which the storing portion 370 is constituted by using the two SRAMs 101 and 102 which are physically different from each other, thus, the storing control portion 373 alternatively stores unstored image data for each pixel row read by the data acquiring control portion 372 in either of the two SRAMs 101 and 102 every pixel row. Consequently, it is possible to read image data from one of the SRAMs 101 and 102 while writing image data to the other SRAM 101 or 102. Therefore, the transfer speed of the image data can be increased.

As shown in FIG. 16, moreover, it is also possible to alternately store the image data read from the image data storing portion 22 in one of the two SRAMs 101 and 102 every predetermined data volume. FIG. 16 illustrates a mode for alternately storing the image data every entry EN, that is, every 16 bytes.

Consequently, it is possible to write and read image data on a predetermined data volume unit concurrently with each other. Therefore, the transfer speed of the image data can further be increased.

In the case in which the image data is stored in the two SRAMs 101 and 102 in the mode of FIG. 16, it is possible to employ the same method as the mode of FIG. 15 as a method of determining a cache address. It is preferable to decide either of the two SRAMs 101 and 102 which is to store the image data by using low order one bit of the cache address which is determined. For example, the image data is stored in the SRAM 101 if the low order one bit is "0", and the image data is stored in the SRAM 102 if the low order one bit is "1".

In the mode of FIG. 15, furthermore, a plurality of classified storage regions is alternately set every number of the classified storage region in either of the two SRAMs 101 and 102. On the other hand, in the mode of FIG. 16, each classified storage region is set across the two SRAMs 101 and 102.

Although the mode in which the image data storing portion 22 is included in the image processing apparatus 1 to be the data transfer apparatus is illustrated in the preferred embodiment, moreover, the present invention is not restricted thereto. In other words, it is also possible to employ a mode in which the image data storing portion 22 may be provided on an outside of the image processing apparatus 1 and the image processing apparatus 1 acquires image data from the image data storing portion 22 provided on the outside.

While the invention has been shown and described in detail, the foregoing description is in all aspects illustrative and not restrictive. It is therefore understood that numerous modifications and variations can be devised without departing from the scope of the invention.

What is claimed is:

1. A data transfer apparatus comprising:
a cache memory having a storing portion for writing and reading data at a higher speed than storing circuitry which stores image data on a predetermined image; and
transfer request circuitry for outputting, to said cache memory, a transfer request for image data in a certain region in said predetermined image,
said cache memory including:
reading control circuitry for deciding, for every pixel row, whether image data in a pixel row included in said certain region corresponding to said transfer request is stored in said storing portion of said cache memory or not and reading unstored image data of the predetermined image, which is not stored in said storing portion, from said storing circuitry beyond said certain region in a row direction in said predetermined image for every pixel row;
storing control circuitry for storing, in said storing portion, the unstored image data for said pixel row, read by said reading control circuitry, with a storage destination changed for every pixel row; and
output control circuitry for reading image data in a certain region corresponding to said transfer request, from said storing portion, and outputting the image data to said transfer request circuitry, wherein said transfer request circuitry sequentially gives a transfer request for image data in each of said certain regions arranged in a horizontal direction of said predetermined image in arrangement order in said horizontal direction, a volume of said unstored image data of said predetermined image is a volume of data obtained from a region longer than a maximum width, in said row direction, of said row direction of said certain region.

2. The data transfer apparatus according to claim 1, wherein said storing portion has a plurality of classified storage regions for dividing and storing, for every pixel row, image data for each of the pixel rows, said plurality of classified storage regions are numbered in order from zero, respectively, and said storing control circuitry stores the unstored image data for each of said pixel rows, read by said reading control circuitry, in a classified storage region indicated by a remainder obtained by dividing a row number of said pixel row in said predetermined image by a total number of said classified storage regions.

3. The data transfer apparatus according to claim 1, wherein said reading control circuitry sequentially reads said unstored image data up to a position exceeding said certain region in a certain row direction every pixel row.

4. The data transfer apparatus according to claim 2, wherein said storing portion has classified storage regions in a number to be a power of two.

5. The data transfer apparatus according to claim 3, wherein said storing portion has classified storage regions in a number to be a power of two.

6. The data transfer apparatus according to claim 1, wherein said transfer request circuitry has a distortion correcting function for performing distortion correction processing which corrects a distortion of said predetermined image, and said transfer request circuitry sets said plurality of certain regions arranged in a horizontal direction of said predetermined image with a gradual shift in a perpendicular direction to said horizontal direction in response to a distortion of said predetermined image.

7. The data transfer apparatus according to claim 2, wherein said storing portion is constituted by using a first storing portion and a second storing portion which are physically different from each other, said plurality of classified storage regions are alternately set every number of the classified storage regions in either of said first storing portion and said second storing portion, and said storing control circuitry alternately stores, every pixel row, the unstored image data for each of said pixel rows, read by said reading control circuitry, in either of said first storing portion and said second storing portion.

8. The data transfer apparatus according to claim 2, wherein said storing portion is constituted by using a first storing portion and a second storing portion which are physically different from each other, each of said plurality of classified storage regions is set across said first storing portion and said second storing portion, and said storing control circuitry alternately stores, every predetermined data volume, the unstored image data for each of said pixel rows, read by said reading control circuitry, in either of said first storing portion and said second storing portion.

9. A data transfer method using a cache memory having a storing portion for writing and reading data at a higher speed than a memory which stores image data on a predetermined image, comprising the steps of:

a) sequentially acquiring a transfer request for image data in each of a plurality of certain regions arranged in a horizontal direction of said predetermined image in arrangement order in said horizontal direction;

b) deciding, for every pixel row, whether image data in a pixel row included in said certain region corresponding to said transfer request is stored in said storing portion of said cache memory or not and reading unstored image data of the predetermined image, which is not stored in said storing portion, from said memory beyond said certain region in a row direction in said predetermined image for every pixel row;

c) storing, in said storing portion, the unstored image data for said pixel row with a storage destination changed for every pixel row; and d) reading image data in a certain region corresponding to said transfer request, from said storing portion, and outputting said image data, wherein a volume of said unstored image data of said predetermined image is a volume of data obtained from a region longer than a maximum width, in said row direction, of said row direction of said certain region.

* * * * *